United States Patent
Hisch

(10) Patent No.: US 12,363,129 B2
(45) Date of Patent: Jul. 15, 2025

(54) DEVICE AND METHOD FOR SENDING A MESSAGE TO AT LEAST TWO RECEIVERS FOR A MOTOR VEHICLE

(71) Applicant: Bayerische Motoren Werke Aktiengesellschaft, Munich (DE)

(72) Inventor: Florian Hisch, Forstinning (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 184 days.

(21) Appl. No.: 17/917,063

(22) PCT Filed: Mar. 8, 2021

(86) PCT No.: PCT/EP2021/055759
§ 371 (c)(1),
(2) Date: Oct. 5, 2022

(87) PCT Pub. No.: WO2021/213726
PCT Pub. Date: Oct. 28, 2021

(65) Prior Publication Data
US 2023/0188535 A1    Jun. 15, 2023

(30) Foreign Application Priority Data
Apr. 20, 2020 (DE) .................. 10 2020 110 708.0

(51) Int. Cl.
*H04L 9/40* (2022.01)
*H04L 12/18* (2006.01)

(52) U.S. Cl.
CPC .......... *H04L 63/123* (2013.01); *H04L 12/18* (2013.01); *H04L 63/0272* (2013.01); *H04L 63/0485* (2013.01); *H04L 63/18* (2013.01)

(58) Field of Classification Search
CPC ............. H04L 63/0272; H04L 63/0485; H04L 63/123; H04L 63/164; H04L 63/18; H04L 12/18; H04W 4/48
See application file for complete search history.

(56) References Cited

U.S. PATENT DOCUMENTS

| 6,223,286 B1 * | 4/2001 | Hashimoto | ........... H04L 63/104 713/168 |
| 7,836,497 B2 * | 11/2010 | Hossain | .................. H04L 69/40 726/13 |

(Continued)

FOREIGN PATENT DOCUMENTS

| CN | 109644124 A | 4/2019 |
| CN | 110377002 A | 10/2019 |

(Continued)

OTHER PUBLICATIONS

Korean-language Office Action issued in Korean Application No. 10-2022-7034751 dated Apr. 3, 2024 with English translation (9 pages).

(Continued)

*Primary Examiner* — David Garcia Cervetti
(74) *Attorney, Agent, or Firm* — Crowell & Moring LLP

(57) ABSTRACT

A device for sending a message to at least two receivers for a motor vehicle is provided. The motor vehicle includes the device and the at least two receivers. The device is configured to ascertain information that is characteristic of an integrity of the message on the basis of the message, to transmit the information that is characteristic of the integrity of the message to the at least two receivers using a communication protocol that ensures the authenticity of the information that is characteristic of the integrity of the message, and to transmit the message to the receivers using a multipoint protocol.

5 Claims, 2 Drawing Sheets

(56) References Cited

U.S. PATENT DOCUMENTS

| | | | |
|---|---|---|---|
| 9,712,510 B2 * | 7/2017 | Vinnik | H04L 63/08 |
| 11,595,366 B2 * | 2/2023 | Schaap | H04L 9/0891 |
| 2007/0199049 A1 * | 8/2007 | Ziebell | H04L 63/10 |
| | | | 726/3 |
| 2007/0260879 A1 * | 11/2007 | Dzung | H04L 63/065 |
| | | | 713/163 |
| 2009/0024845 A1 * | 1/2009 | Benshetler | H04L 9/3263 |
| | | | 713/156 |
| 2009/0129586 A1 * | 5/2009 | Miyazaki | H04L 63/20 |
| | | | 707/999.005 |
| 2009/0210707 A1 * | 8/2009 | De Lutiis | H04L 63/123 |
| | | | 713/170 |
| 2009/0310571 A1 | 12/2009 | Matischek et al. | |
| 2010/0165839 A1 * | 7/2010 | Senese | H04L 69/28 |
| | | | 370/232 |
| 2012/0017080 A1 * | 1/2012 | Liu | H04L 12/189 |
| | | | 713/155 |
| 2012/0017088 A1 * | 1/2012 | Liu | H04W 12/062 |
| | | | 713/171 |
| 2012/0151554 A1 * | 6/2012 | Tie | H04L 63/0823 |
| | | | 726/1 |
| 2012/0159587 A1 * | 6/2012 | Ge | H04L 63/061 |
| | | | 726/6 |
| 2013/0016838 A1 * | 1/2013 | Hu | H04W 12/106 |
| | | | 380/255 |
| 2013/0132730 A1 * | 5/2013 | Falk | H04W 12/106 |
| | | | 713/181 |
| 2013/0179687 A1 * | 7/2013 | Falk | G06F 21/44 |
| | | | 713/168 |
| 2013/0310016 A1 * | 11/2013 | Park | H04W 28/18 |
| | | | 455/418 |
| 2016/0165013 A1 | 6/2016 | Agiwal et al. | |
| 2017/0026828 A1 * | 1/2017 | Sakai | H04W 12/06 |
| 2017/0126645 A1 | 5/2017 | Froelicher et al. | |
| 2018/0077171 A1 * | 3/2018 | Ramanujan | H04L 63/1483 |
| 2018/0083785 A1 * | 3/2018 | Shields | H04W 12/033 |
| 2018/0131524 A1 * | 5/2018 | Shin | H04L 9/14 |
| 2019/0124509 A1 * | 4/2019 | Nakarmi | H04L 63/123 |
| 2019/0207915 A1 * | 7/2019 | Schaap | H04L 9/0891 |
| 2019/0207950 A1 * | 7/2019 | Mohammed | H04L 63/14 |
| 2019/0253167 A1 * | 8/2019 | Wihamre | H04L 69/28 |
| 2019/0268420 A1 * | 8/2019 | Acharya | H04L 63/166 |
| 2019/0289020 A1 * | 9/2019 | Heintel | H04L 63/1408 |
| 2019/0313446 A1 | 10/2019 | Kim et al. | |
| 2020/0021993 A1 * | 1/2020 | Yang | H04L 63/123 |
| 2020/0389469 A1 * | 12/2020 | Litichever | H04W 4/40 |
| 2021/0314748 A1 * | 10/2021 | Cominetti | H04W 12/069 |
| 2022/0391893 A1 * | 12/2022 | Brezo Fernández | |
| | | | G06Q 20/384 |

FOREIGN PATENT DOCUMENTS

| | | |
|---|---|---|
| EP | 1 499 038 A1 | 1/2005 |
| EP | 3 346 648 A1 | 7/2018 |
| JP | 2017-121091 A | 7/2017 |
| JP | 2019-531646 A | 10/2019 |
| JP | 2020-5322 A | 1/2020 |
| KR | 10-1334017 B1 | 12/2013 |
| KR | 10-2018-0079324 A | 7/2018 |
| KR | 10-2019-0034324 A | 4/2019 |
| WO | WO 03/092189 A1 | 11/2003 |
| WO | WO-2007131523 A1 * | 11/2007 ........ H04L 63/123 |
| WO | WO 2018/057321 A2 | 3/2018 |
| WO | WO 2019/123447 A1 | 6/2019 |

OTHER PUBLICATIONS

H. Qiang et al. "Review of Secure Communication Approaches for In-Vehicle Network". International Journal of Automotive Technology, The Korean Society of Automotive Engineers, Heidelberg, vol. 19, No. 5, Sep. 12, 2018 (Sep. 12, 2018), pp. 879-894, [retrieved on Sep. 12, 2018] DOI: 10.1007/SI2239-018-0085-I ISSN: 1229-9138, XP036591092 dated Apr. 15, 2018 (16 pages).

International Search Report (PCT/ISA/210) issued in PCT Application No. PCT/EP2021/055759 dated Apr. 29, 2021 with English translation (six (6) pages).

German-language Written Opinion (PCT/ISA/237) issued in PCT Application No. PCT/EP2021/055759 dated Apr. 29, 2021 (six (6) pages).

German-language Search Report issued in German Application No. 10 2020 110 708.0 dated Mar. 3, 2021 with partial English translation (13 pages).

A. Radu et al.: "LeiA: Alightweight Authentication Protocol for CAN", Sep. 15, 2016 (Sep. 15, 2016), ICIAP: International Conference on Image Analysis and Processing, 17th International Conference, Naples, Italy, dated Sep. 9-13, 2013 ISBN: 978-3-642-17318-9. XP047356183 (18 pages).

D. Zelle et al.: "On Using TLS to Secure In-Vehicle Networks", Availability, Reliability and Security, ACM, 2 Penn Plaza, Ste. 701 New York, NY 10121-0701 USA, dated Aug. 29, 2017 DOI: 10.1145/3098954.3105824 ISBN : 978-1-4503-5257-4. XP058371000 (10 pages).

P. Mundhenk et al.: "Security in Automotive Networks: Lightweight Authentication and Authorization", arxiv.org, Cornell University Library, 201 OLIN Library Cornell University Ithaca, NY 14853, dated Mar. 10, 2017 DOI: 10.1145/2960407 XP080756068 (25 pages).

German-language Wikipedia article on "Local Interconnect Network" dated Apr. 17, 2020 (three (3) pages).

"Rechtsfolgen zunehmender Fahrzeugautomatisierung", Bundesanstalt fuer Strassenwesen (BASt) [German Federal Highway Research Institute], Forschung kompakt [Research News] , Edition Nov. 2012 with English Abstract (two (2) pages).

"(R) Taxonomy and Definitions for Terms Related to Driving Automation Systems for On-Road Motor Vehicles", Surface Vehicle Recommended Practice, SAE (Society of Automotive Engineering) International, J3016™, Sep. 2016, pp. 1-30 (30 pages).

Japanese-language Office Action issued in Japanese Application No. 2022-562163 dated Nov. 27, 2024 with English translation (6 pages).

Chinese-language Office Action issued in Chinese Application No. 202180029155.6 dated Jan. 10, 2025 (9 pages).

* cited by examiner

DEVICE AND METHOD FOR SENDING A MESSAGE TO AT LEAST TWO RECEIVERS FOR A MOTOR VEHICLE

BACKGROUND AND SUMMARY OF THE INVENTION

The invention relates to a device and to a method for sending a message to at least two receivers for a motor vehicle.

The term "automated driving" in the context of this document may be understood to mean driving with automated longitudinal or transverse guidance or autonomous driving with automated longitudinal and transverse guidance. The term "automated driving" comprises automated driving with any degree of automation. Exemplary degrees of automation are assisted, partly automated, highly automated or fully automated driving. These degrees of automation have been defined by the German Federal Highway Research Institute (BASt) (see BASt publication "Forschung kompakt" [Compact research], issued November 2012). In the case of assisted driving, the driver continuously performs longitudinal or transverse guidance while the system takes over the respective other function within certain limits. In the case of partly automated driving (TAF), the system takes over the longitudinal and transverse guidance for a certain duration and/or in specific situations, wherein the driver has to continuously monitor the system as in the case of assisted driving. In the case of highly automated driving (HAF), the system takes over the longitudinal and transverse guidance for a certain duration without the driver having to continuously monitor the system; the driver must however be capable within a certain time of taking over vehicle guidance. In the case of fully automated driving (VAF), the system is able to automatically manage driving in all situations for a specific application case; a driver is then no longer required for this application case. The four degrees of automation mentioned above in accordance with the definition of the BASt correspond to SAE Levels 1 to 4 of the SAE J3016 standard (SAE—Society of Automotive Engineering). By way of example, highly automated driving (HAF) according to the BASt corresponds to Level 3 of the SAE J3016 standard. SAE J3016 furthermore also provides SAE Level 5 as the highest degree of automation, this not being contained in the definition of the BASt. SAE Level 5 corresponds to driverless driving, in which the system is able to automatically manage all situations in the same way as a human driver throughout the entire journey; a driver is then generally no longer required.

In automated motor vehicles, large amounts of data have to be transmitted from one controller to multiple other controllers. These data have to be protected in terms of authenticity and integrity during transmission.

IPsec protects a communication with regard to authenticity and integrity, but the IPsec standards have the limitation of focusing on 1-to-1 communication. This rules out efficient protected 1-to-N communication, which leads to considerably increased resource demands on the communication buses and in the controllers.

The object of the invention is to reduce the resource demand on the communication buses and in the controllers and still to ensure authenticity and integrity of the transmitted data.

The object is achieved by the features of the claimed invention. It is pointed out that additional features of a patent claim dependent on an independent patent claim, without the features of the independent patent claim or only in combination with a subset of the features of the independent patent claim, may form a separate invention independent of the combination of all of the features of the independent patent claim, that may be made into the subject matter of an independent claim, a divisional application or a subsequent application. This applies analogously to the technical teaching described in the description, which teaching may form an invention independent of the features of the independent patent claims.

A first aspect of the invention relates to a device for sending a message to at least two receivers for a motor vehicle. The device is in particular a software component that is executed by a controller, from which the message is transmitted to the at least two receivers.

The motor vehicle comprises the device and the at least two receivers. This thus involves a communication in the motor vehicle and the accompanying resource restrictions.

The device is configured to ascertain information characteristic of the integrity of the message on the basis of the message.

Integrity of the message is present when the message is received unchanged by the at least two receivers, or when undesirable modifications that cannot be prevented are at least identified.

The information characteristic of the integrity of the message is for example a checksum. A checksum is basically a value that has been calculated from the starting data and is able to identify at least one bit error in the data. Depending on the complexity of the calculation rule for the checksum, multiple errors may be identified or even corrected. The calculated checksum is stored or transmitted with the data by the transmitter. The receiver then calculates the checksum from the received data using the same method and compares it with the transmitted checksum from the transmitter. If the two checksums are different, a transmission error is present. If the two checksums are identical, the message has most likely been transmitted correctly. One simple example of a checksum is the sum of the digits or the parity bit.

The device is therefore configured for example to ascertain information characteristic of the integrity of the message on the basis of the message by virtue of the device being configured to calculate a checksum from the message.

The device is furthermore configured to transmit the information characteristic of the integrity of the message to the at least two receivers using a communication protocol that guarantees the authenticity of the information characteristic of the integrity of the message. Authenticity denotes the properties of genuineness, checkability and trustworthiness. Authenticating the origin of the data proves that data are able to be associated with an assumed transmitter, which may be enabled for example by digital signatures.

The device is furthermore configured to transmit the message to the receivers using a multipoint protocol.

A multipoint protocol is in particular a multicast or a broadcast protocol.

Multicast denotes a message transmission from one point to a group. In this case, messages are transmitted simultaneously to multiple subscribers or to a closed subscriber group without the data transmission rate used therefor at the transmitter being multiplied by the number of receivers. If packet-oriented data transmission is involved, the data packets are multiplied at each individual distributor (router, switch or hub) on the route.

The difference in relation to broadcast is that broadcast involves broadcasting content that anyone—with suitable reception equipment—is able to see, whereas, in the case of multicast, previous registration with the transmitter is necessary.

In one advantageous embodiment, the device is configured to transmit the information characteristic of the integrity of the message in each case separately to the at least two receivers using a communication protocol that guarantees the authenticity of the information characteristic of the integrity of the message. The device thus transmits for example a dedicated integrity message comprising the information characteristic of the integrity of the message to each of the at least two receivers.

The invention is based here on the finding that, although the message itself may be very large, the information characteristic of the integrity of the message is usually relatively small. In order to ensure the authenticity of the message, it is sufficient to transmit the information characteristic of the integrity of the message using the communication protocol that guarantees the authenticity.

In a further advantageous embodiment, the multipoint protocol is a multicast protocol.

In a further advantageous embodiment, the communication protocol that guarantees the authenticity of the information characteristic of the integrity of the message is an IPsec protocol.

Internet Protocol Security (IPsec) is a protocol suite that is intended to allow secure communication over potentially unsecure IP networks.

IPsec operates directly on the network layer ("Internet Layer", corresponds to OSI Layer 3) of the DoD model and is a development of the IP protocol. The aim is to provide encryption-based security on the network level. IPsec in this case offers connection-dependent integrity and authentication of the data.

The implementation of IPsec is defined in particular in RFC 4301 and in RFC 4306 from the Internet Engineering Task Force.

In a further advantageous embodiment, the communication protocol that guarantees the authenticity of the information characteristic of the integrity of the message is an IPsec unicast protocol.

Unicast in this case denotes the addressing of a message to a single receiver. A separate message is thus sent to each of the at least two receivers by way of the IPsec protocol.

In a further advantageous embodiment, the information characteristic of the integrity of the message is a checksum over the message. Suitable checksums result efficiently from the already existing end-to-end security layers (E2E security) used in communication in motor vehicles.

A second aspect of the invention is a method for sending a message to at least two receivers in a motor vehicle.

One step of the method is ascertaining information characteristic of the integrity of the message on the basis of the message. This integrity information is derived efficiently from already calculated checksums of the end-to-end security (E2E security). If no end-to-end security is present, then the integrity information is ascertained directly from the message.

A further step of the method is transmitting the information characteristic of the integrity of the message to the at least two receivers using a communication protocol that guarantees the authenticity of the information characteristic of the integrity of the message.

A further step of the method is transmitting the message to the receivers using a multipoint protocol.

The above explanations regarding the device according to the invention according to the first aspect of the invention also apply analogously to the method according to the invention according to the second aspect of the invention. Advantageous exemplary embodiments of the method according to the invention that are not described explicitly here and in the patent claims correspond to the advantageous exemplary embodiments of the device according to the invention that are described above or described in the patent claims.

The invention is described below on the basis of an exemplary embodiment with the aid of the accompanying drawings.

DETAILED DESCRIPTION OF THE DRAWINGS

Figure 1:
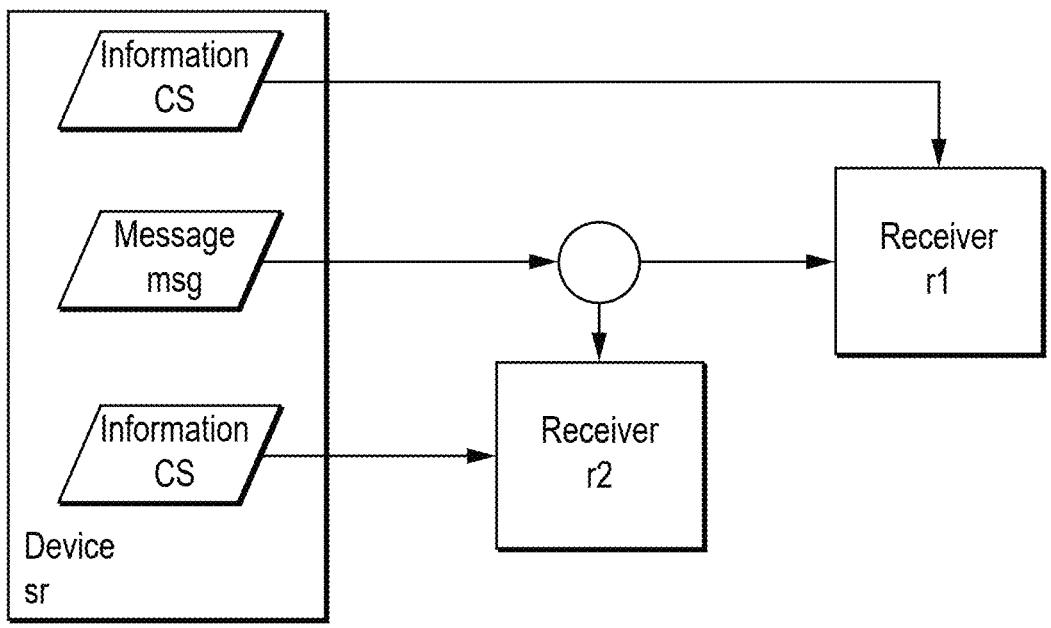
FIG. 1 shows one exemplary embodiment of the device according to the invention.

FIG. 1 shows one exemplary embodiment of the device sr according to the invention for sending a message msg to at least two receivers r1, r2 for a motor vehicle, wherein the motor vehicle comprises the device sr and the at least two receivers r1, r2.

The device sr is configured to ascertain 100 information cs characteristic of the integrity of the message msg, in particular a checksum, on the basis of the message msg.

The device sr is furthermore configured to transmit 200 the information cs characteristic of the integrity of the message msg to the at least two receivers r1, r2 using a communication protocol that guarantees the authenticity, in particular an IPsec unicast protocol, in a manner protected by authenticity information ah1, ah2.

The device sr is furthermore configured to transmit 300 the message msg to the receivers r1, r2 using a multipoint protocol, in particular a multicast protocol.

Figure 2:
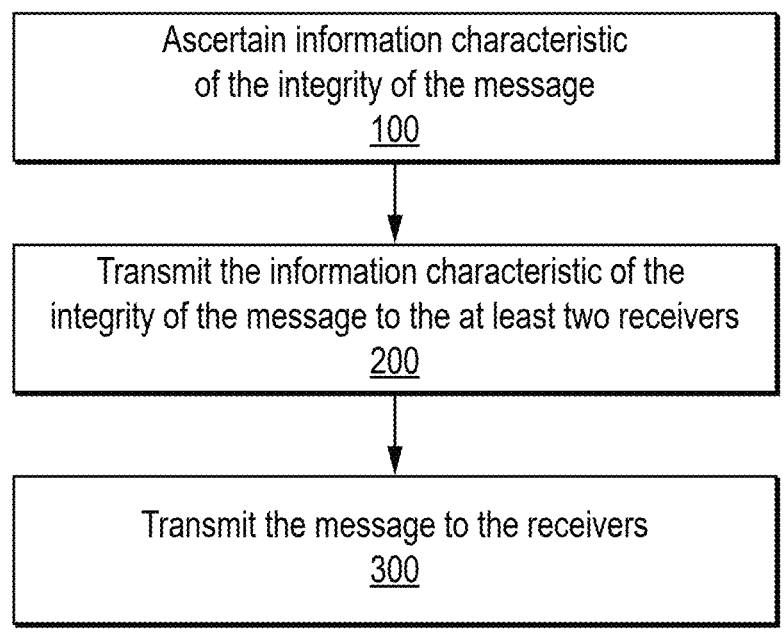
FIG. 2 shows one exemplary embodiment of the method according to the invention.

FIG. 2 shows one exemplary embodiment of the method according to the invention for sending a message msg to at least two receivers r1, r2 in a motor vehicle.

One step of the method is ascertaining 100 information cs characteristic of the integrity of the message msg on the basis of the message msg.

A further step of the method is transmitting 200 the information cs characteristic of the integrity of the message msg to the at least two receivers r1, r2 using a communication protocol that guarantees the authenticity of the information cs characteristic of the integrity of the message msg.

A further step of the method is transmitting 300 the message msg to the receivers r1, r2 using a multipoint protocol.

Figure 3:
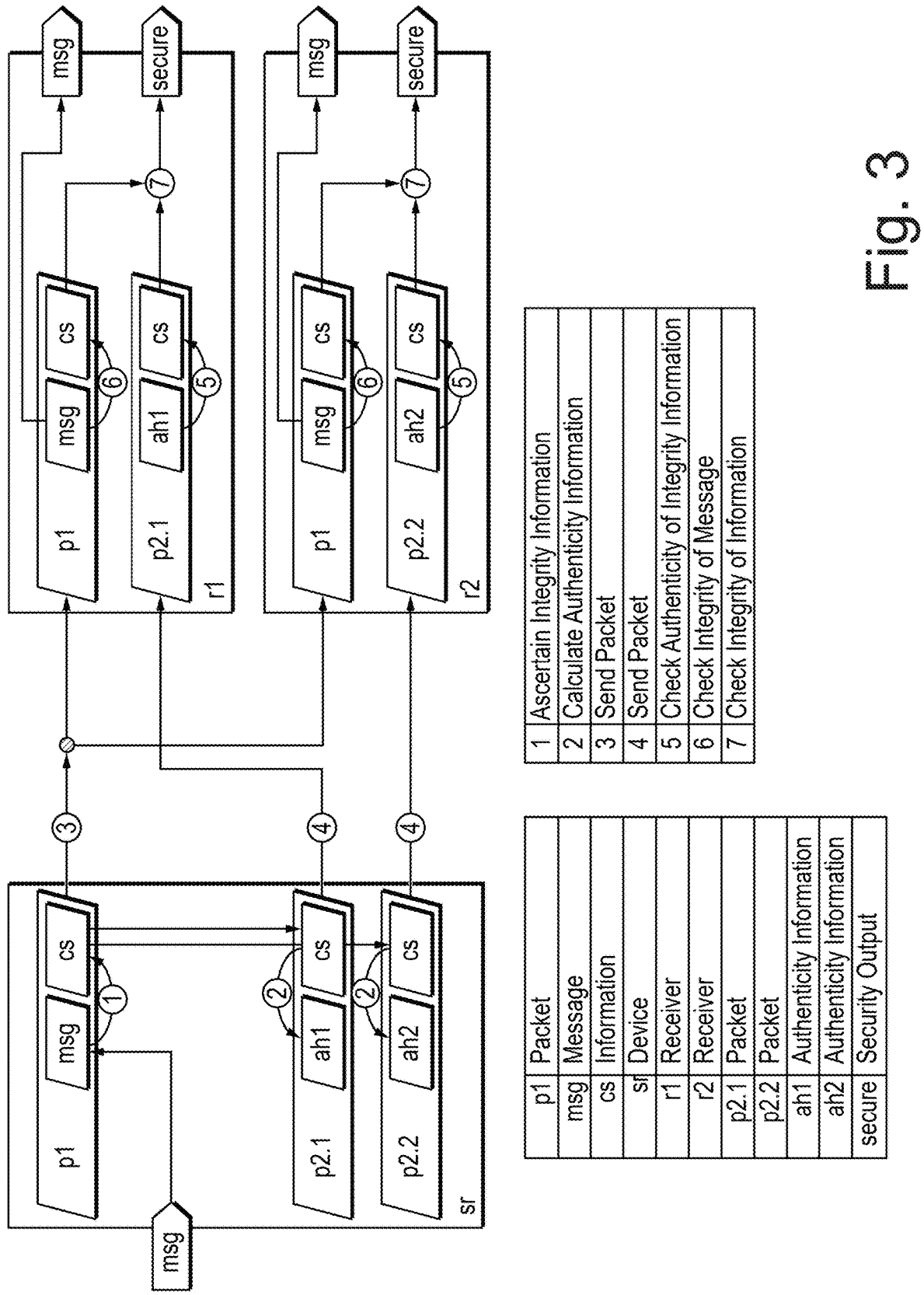
FIG. 3 shows a further exemplary embodiment of the device according to the invention.

FIG. 3 shows a further exemplary embodiment of the device sr according to the invention for sending a message msg to at least two receivers r1, r2 for a motor vehicle.

The device sr is configured to ascertain (1) information cs characteristic of the integrity of the message msg, in particular a checksum, on the basis of the message msg.

The device sr is furthermore configured to calculate (2) respective authenticity information ah1, ah2 from the integrity information cs for each receiver r1, r2, in particular using a communication protocol that guarantees authenticity and integrity, for example IPsec.

The device sr is furthermore configured to send (3) a packet p1 comprising the message msg and the integrity information msg to the receivers r1, r2 using a multipoint protocol, for example IP multicast, and to send (4) a respective packet p2.1, p2.2 comprising authenticity information ah1, ah2 to the receivers r1, r2, wherein these packets p2.1, p2.2 in particular each also comprise the integrity information cs.

The receivers r1, r2 are each configured to inspect (5) the authenticity of the integrity information cs on the basis of the authenticity information ah1, ah2.

The receivers r1, r2 are furthermore each configured to check (6) the integrity of the message msg using the received integrity information cs.

The receivers r1, r2 are additionally in particular each configured to check (7) the identity of the integrity information cs in the packets p1 and p2.1 or p2.2. In the event of a disparity or an error in the authenticity check (5) or integrity check (6), a user is for example notified via a security output secure. In the event of identity and no errors, the message msg is for example made available to the user via a corresponding output.

The invention claimed is:

1. A transmitter for sending a message to at least two receivers for a motor vehicle, wherein the motor vehicle comprises the transmitter and the receivers, and the transmitter is configured:
   to ascertain information characteristic of an integrity of the message based on the message,
   to determine, from the information characteristic of the integrity of the message, first authenticity information for a first receiver of the receivers and second authenticity information for a second receiver of the receivers, wherein the first authenticity information is different from the second authenticity information,
   to transmit the information characteristic of the integrity of the message separately to the receivers using a unicast communication protocol that guarantees an authenticity of the information characteristic of the integrity of the message, including transmitting a first packet comprising the first authenticity information and the information characteristic of the integrity of the message to the first receiver and transmitting a second packet comprising the second authenticity information and the information characteristic of the integrity of the message to the second receiver, and
   to transmit the message to the receivers using a multicast protocol.

2. The transmitter according to claim 1, wherein the communication protocol that guarantees the authenticity of the information characteristic of the integrity of the message is an IPsec protocol.

3. The transmitter according to claim 1, wherein the communication protocol that guarantees the authenticity of the information characteristic of the integrity of the message is an IPsec unicast protocol.

4. The transmitter according to claim 1, wherein the information characteristic of the integrity of the message is a checksum over the message.

5. A method for sending a message to at least two receivers in a motor vehicle, the method comprising:
   ascertaining information characteristic of an integrity of the message based on the message,
   determining, from the information characteristic of the integrity of the message, first authenticity information for a first receiver of the receivers and second authenticity information for a second receiver of the receivers, wherein the first authenticity information is different from the second authenticity information,
   transmitting the information characteristic of the integrity of the message separately to the receivers using a unicast communication protocol that guarantees an authenticity of the information characteristic of the integrity of the message, including transmitting a first packet comprising the first authenticity information and the information characteristic of the integrity of the message to the first receiver and transmitting a second packet comprising the second authenticity information and the information characteristic of the integrity of the message to the second receiver, and
   transmitting the message to the receivers using a multicast protocol.

* * * * *